May 12, 1959 — R. F. WILSON — 2,886,139
AUXILIARY VEHICLE BRAKE
Filed Aug. 1, 1957 — 2 Sheets-Sheet 1
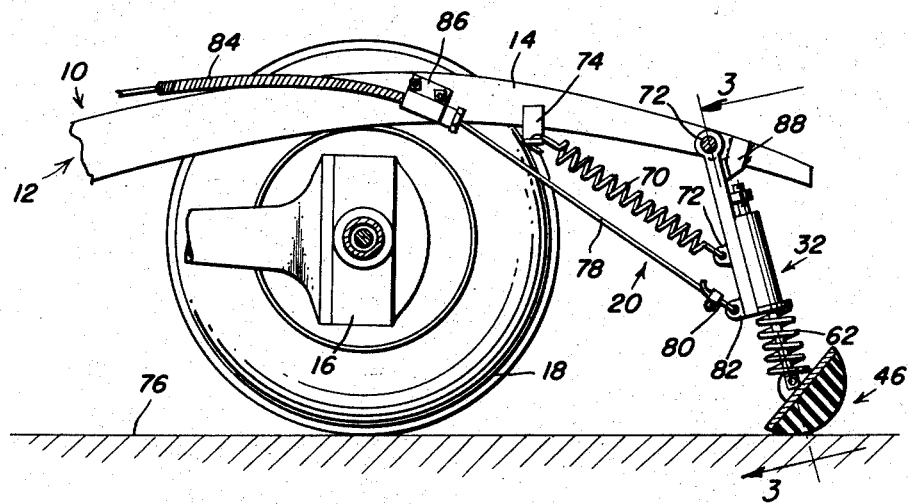
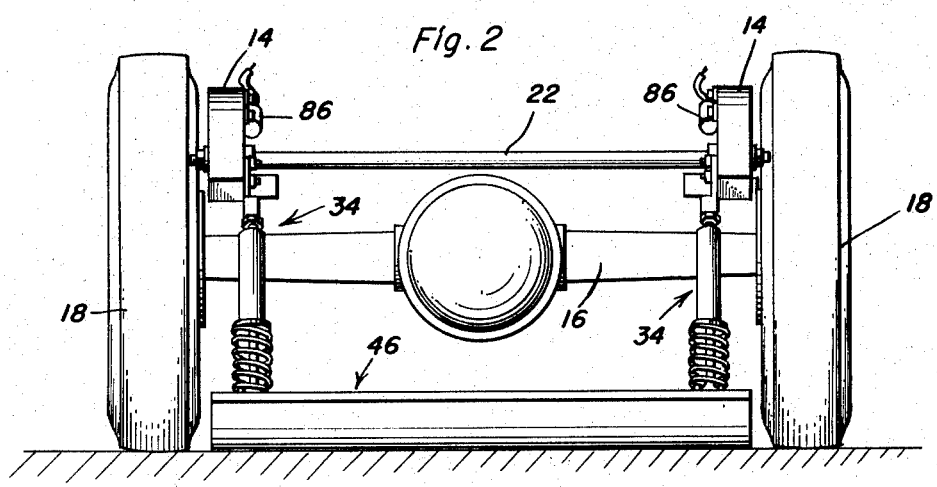
Reid F. Wilson
INVENTOR.

May 12, 1959 R. F. WILSON 2,886,139
AUXILIARY VEHICLE BRAKE
Filed Aug. 1, 1957 2 Sheets-Sheet 2
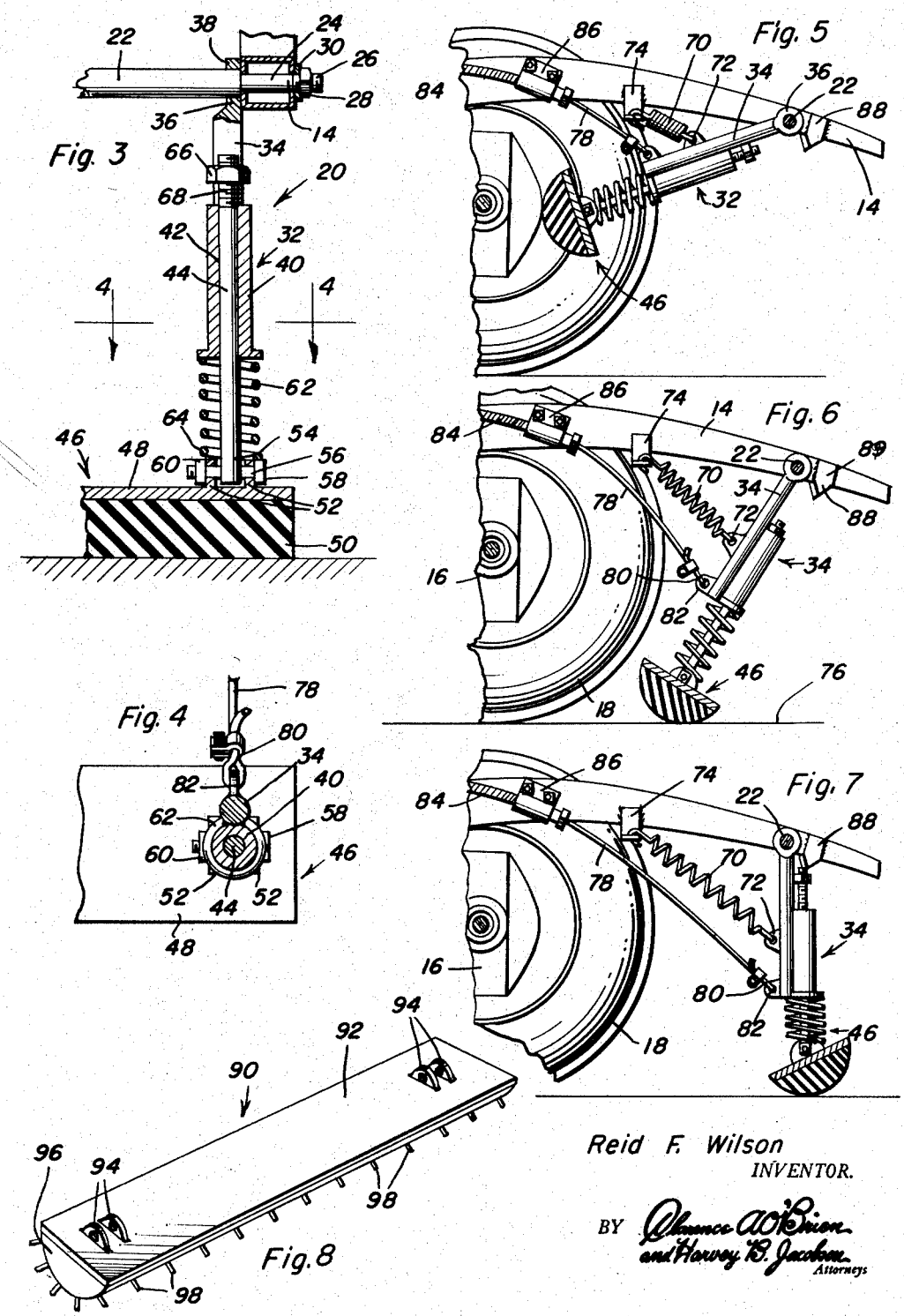
Reid F. Wilson
INVENTOR.

United States Patent Office 2,886,139
Patented May 12, 1959

2,886,139

AUXILIARY VEHICLE BRAKE

Reid F. Wilson, High Point, N.C.

Application August 1, 1957, Serial No. 675,621

1 Claim. (Cl. 188—5)

This invention relates in general to new and useful improvements in vehicles, and more specifically to a vehicle brake which is to be used in addition to existing vehicle brakes.

Although modern day vehicle brakes, including hydraulic brakes, normally perform satisfactorily, under emergency conditions there have been many instances of brake failure. In hydraulic systems this has been primarily occasioned by either a breakage of one of the brake lines, or the failure of one of the brake cylinders, either the master brake cylinder or one of the wheel cylinders. In connection with vehicles having air brakes, in many instances the compressor has not functioned or there has been a break in the airline.

It is therefore the primary object of this invention to provide an auxiliary vehicle brake which is in the form of a drag brake which may be mounted on the rear of the conventional vehicle and which may be manually controlled from the driver's seat of the vehicle so as to provide for the effective braking of the vehicle under emergency conditions.

Another object of this invention is to provide an improved auxiliary vehicle brake, the auxiliary vehicle brake being so constructed whereby it may be mounted beneath the vehicle at the rear thereof in an out-of-the-way position, the auxiliary brake being self-contained and requiring only a simple operator which may be mounted adjacent the operator's seat of the vehicle for manual control by the operator.

Another difficulty with present vehicle brakes is that the vehicle brakes relying upon the stopping of the vehicle wheels. On slippery pavements there is a tendency for the vehicle to skid sideways when the brakes are applied due to the fact that the vehicle tires do not have sufficient traction in a sideways direction.

It is therefore another object of this invention to provide an improved auixiliary vehicle brake which is so constructed whereby it extends substantially the full width of the vehicle at the rear thereof and resists any transverse sliding of the vehicle when the regular brakes thereof are applied, the auxiliary vehicle brake having a wide road contacting surface.

A further object of this invention is to provide an improved auxiliary vehicle brake, the auxiliary vehicle brake being of such a nature whereby once it is moved into a roadway engaging position, further forward movement of the vehicle will result in the automatic pivoting of the brake to its final roadway engaging position for braking the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary longitudinal sectional view taken through the rear portion of a vehicle frame with the cross frames of the vehicle at the rear thereof being omitted for purposes of clarity, there being mounted on the vehicle frame the auxiliary vehicle brake which is the subject of this invention;

Figure 2 is a rear elevational view of the vehicle of Figure 1 showing the frame rear end of the vehicle only, there being shown further details of the vehicle brake;

Figure 3 is an enlarged fragmentary sectional view taken substantially upon the plane indicated by the section line 3—3 of Figure 1 and shows the specific details of one of the support units of the vehicle brake and its connection to the brake member thereof;

Figure 4 is an enlarged fragmentary horizontal sectional view taken substantially upon the plane indicated by the section line 4—4 of Figure 3 and shows the cross-section of the support unit and the manner in which a control rod is connected thereto;

Figure 5 is a fragmentary sectional view similar to Figure 1 and shows the auxiliary vehicle brake in its stored position;

Figure 6 is a sectional view like Figure 5 showing the vehicle brake in an initial roadway engaging position;

Figure 7 is another sectional view similar to Figure 5 and shows the vehicle brake in a vertical position immediately before it passes beyond its vertical dead center position to its operative position of Figure 1; and Figure 8 is a perspective view of a modified form of brake member for use on ice and snow covered pavements.

Referring now to the drawings in detail, and Figures 1 and 2 in particular, it will be seen that there is illustrated a rear portion of a conventional type of automotive vehicle which is referred to in general by the reference numeral 10. The vehicle 10 includes a frame 12 which is formed of a pair of longitudinally extending frame rails 14 which are transversely spaced. Suitably connected to the frame 14 by spring means (not shown for purposes of clarity) is a rear axle assembly 16 which carries rear wheels 18. Secured to the frame 12 and disposed rearwardly of the rear axle assembly 16 is the auxiliary vehicle brake, which is the subject of this invention, the auxiliary vehicle brake being referred to in general by the reference numeral 20.

As is best shown in Figures 2 and 3, the vehicle brake 20 includes a mounting shaft 22. The mounting shaft 22 extends transversely between the frame rails 14 and is provided with reduced end portions 24 which extend through the individual frame rails 14. The extreme end parts of the end portions 24 are provided with external threads 26 on which there are threadedly engaged nuts 28. Each nut 28 bears against a washer 30 which in turn bears against its associated frame rail 14.

Pivotally mounted on the mounting shaft 22 immediately adjacent the inner surface of each of the frame rails 14 is a support unit which is referred to in general by the reference numeral 32. As is best shown in Figures 3 and 5, each support unit 32 includes a hanger 34 which is provided at its upper end with an enlarged end portion 36. The end portion 36 is provided with a bore 38 through which the mounting shaft 22 passes. If desired, the end portion 36 may be formed by flattening the upper end of the hanger 34. This is best shown in Figure 3.

Secured to the lower part of the hanger 34 and projecting rearwardly therefrom is a sleeve 40. The sleeve 40 has an axis parallel to the axis of the hanger 34 and includes a bore 42 through which there passes a support rod 44. The support rod 44 has pivotally connected to its lower end a brake member 46.

The brake member 46 includes an upper reinforcing plate 48 which has secured to the underside thereof a brake element 50, the brake element 50 being preferably in the form of a semi-cylindrical rubber member. It is to be noted that the brake member 46 extends between the support units 32 and retain them in their spaced relation.

The reinforcing plate 48 is provided adjacent each end thereof with a pair of spaced upstanding ears 52. Disposed between the ears 52 is an end 54 of one of the support rods 44. Passing through the ears 52 and the lower end 54 of each associated support rod 44 is a headed pin 56 which includes a head 58 which bears against one of the ears 52. Carried by the opposite end of the pin 56 is a removable retainer 60 which bears against the other of the ears 52.

In order that the brake member 46 may move upwardly with respect to the sleeve 40, when necessary, and at the same time may be retained in the position illustrated in Figure 3, there is provided a coil spring 62. The coil spring 62 surrounds the lower part of the support rod 44 and has its upper end in abutting engagement with the lower end of its associated sleeve 40. Carried by a lower portion of the support rod 44 is a collar 64 against which the lower end of the spring 62 bears.

The relationship between the brake member 46 and the sleeve 40 is controlled by means of a stop nut 66 which is threaded engaged on an externally threaded portion 68 of the support rod 44. The stop nut 66 is disposed above the sleeve 40 and engages the upper end thereof to limit downward movement of the support rod 44. If desired, the stop nut 66 may be used to tension the coil spring 62.

As is best shown in Figure 5, the auxiliary vehicle brake 20 is normally stored beneath the vehicle immediately rearwardly of the wheel axle unit 16. In this position the support units 32 slope downwardly and forwardly and the brake member 46 is in its forwardmost position. The vehicle brake 20 is urged to and retained in its position of Figure 5 by return means which includes a coil spring 70. The coil spring 70 has its rear end anchored to an ear 72 carried by its hanger 34 intermediate the ends thereof. The forward end of the coil spring 70 is connected to a mounting bracket 74 which is carried by an associated one of the frame rails 14. It is to be understood that there will be one coil spring 70 for each of the support units 32 and that the coil springs 70 will act as counterbalances for the support units 32.

In order that the support units 32 may be urged rearwardly from their stored positions of Figure 5 to a position, such as that shown in Figure 6, where the brake member 46 engages a road surface, such as the roadway 76, there is provided a control means which includes a control cable 78. The control cable 78 is provided at the rear end thereof with a loop 80 which passes through an ear 82 carried by a lower forward part of the hanger 34. The control cable 78 is flexible and passes through a flexible housing 84 which is anchored at its rear end to its associated frame rail 14 by means of a mounting bracket 86. It is to be understood that the vehicle brake 20 includes a pair of control cables 78 and that their forward ends will be connected together for simultaneous operation. Although it has not been shown, a conventional type of operator will be connected to the forward end of the control rods 78 whereby they may be actuated from a position adjacent the driver's seat of the vehicle. Although the control rods 78 are flexible, they will have sufficient rigidity, when coupled with the gravitational forces on the support units 34, to move the support units 34 rearwardly into operative positions.

In order that the rearward movement of the brake member 46 and the support units 32 may be limited, there is carried by each of the frame rails 14 rearwardly of the mounting shaft 22 a stop member 88. Each stop member 88 is secured to its associated frame rail 14 by suitable securing means, such as welding 88. Each stop member 88 is so positioned whereby it will engage the hanger 34 of its associated support unit 32 after the support unit 32 has moved to a position rearwardly of the vertical, as is best shown in Figure 1. At this time the brake member 46 will be in a most efficient drag position for effecting a braking operation.

As is best shown in Figure 1, when the auxiliary vehicle brake is in an operative position, the brake member 46 thereof is in a dragging position under slight downward pressure from the coil spring 62, which pressure may be varied by adjusting the stop nut 66. Because of the dragging action and the fact that the support units 32 are limited in their rearward swinging movement, it will be seen that there is a maximum pressure engagement between the brake member 46 and the roadway 76.

When it is desired to retract or release the auxiliary vehicle brake 20, it is merely necessary to back up the vehicle 10. At that time the brake member 46 will automatically swing first to its position of Figure 7 and then to its position of Figure 6. Should the control cables 78 be released, the coil springs 70 will then retract the vehicle brake 20 to its stored position of Figure 5.

The brake member 46 is most suited for conditions either on dry pavements or on wet pavements and is not particularly adapted to icy and snowy roads although it will be effective to a certain extent. Referring now to Figure 8 in particular, it will be seen that there is illustrated a modified form of brake member which is referred to in general by the reference numeral 90. The brake member 90 includes a reinforcing plate 92 which is provided adjacent its opposite ends with pairs of ears 94 for connection to the lower ends of the support rods 44. Secured to the underside of the reinforcing plate 92 is a brake element 96 which may be formed of rubber, as is the brake element 50. However, other suitable materials may be utilized. Carried by the brake element 96 and projecting downwardly therefrom in radiating relation and transversely spaced relation is a plurality of spikes 98. The spikes 98 will effectively dig into icy and snowy surfaces so as to produce a maximum braking action on such surfaces.

It is to be understood that the brake member 90 is intended to be a replacement for the brake member 46. Except during the winter months the brake member 46 will be used. Then by removing the headed pins 56, the brake member 90 may be interchanged for the brake member 46. Since only two pivot members must be removed in order to effect the changing of the brake members 46 and 90, one for the other, it will be seen that the job is a minor one. This is particularly true inasmuch as the brake members 46 and 90 will be in accessible positions once the vehicle is on a hoist.

From the foregoing description of the present invention, it will be obvious that the auxiliary brake 20 is of such a construction whereby it may be readily mounted either on existing vehicles or on new productions. Also, because of the simplicity of the invention, the cost thereof is relatively small. Further, because of the construction of the auxiliary vehicle brake 20, it may be readily stored beneath the existing vehicles in an out-of-the-way position. In fact, it will be seen that the components of the vehicle brake 20 are protected by the rear axle housing or unit 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In combination with a vehicle of the type including a frame and rear wheels with the frame including a pair of longitudinally extending transversely spaced frame rails, an auxiliary brake; said auxiliary brake comprising a transverse shaft extending between and supported by said frame rails rearwardly of said rear wheels, depending hangers pivotally mounted on opposite end portions of said shaft adjacent said frame rails, a sleeve secured to a lower rear portion of each of said hangers, a support rod extending through each sleeve and depending therebelow, each support rod having an externally threaded upper portion and an adjustable stop member threadedly engaged thereof limiting downward movement of the support rod through its respective sleeve, a transversely extending ground engageable brake member extending between lower ends of said support rods, means pivotally connecting said brake member to said support rods for rocking movement about a horizontal transverse axis, springs telescoped over said support rods below said sleeves and resiliently urging said brake member downwardly, stop members on said frame rails rearwardly of the connections between said shaft and said frame rails and projecting into alignment with said hangers for engagement by said hangers to limit rearward movement of said hangers and said brake member, a forwardly and upwardly extending resilient tension member extending between each hanger and its respective frame rail for counterbalancing the effect of gravitational forces on said hangers and said brake member, and remotely actuated control means carried by said frame and connected to at least one of said hangers.

References Cited in the file of this patent

UNITED STATES PATENTS

| | | |
|---|---|---|
| 1,171,658 | Ross | Feb. 15, 1916 |
| 1,323,934 | Tweeden | Dec. 2, 1919 |
| 1,338,036 | Oppenheimer | Apr. 27, 1920 |
| 1,495,915 | McNames | May 27, 1924 |
| 2,425,787 | Cracraft | Aug. 19, 1947 |
| 2,695,682 | Ehlinger | Nov. 30, 1954 |